United States Patent [19]

von Benda et al.

[11] 3,923,542
[45] Dec. 2, 1975

[54] ELECTROLYTE FOR GALVANIC CELLS WITH HYDROGEN STORAGE ELECTRODES

[75] Inventors: Klaus von Benda, Kemnat; Wolfgang Lohnert, Waiblingen, both of Germany

[73] Assignee: Firma Deutsche Automobilgesellschaft mbH, Germany

[22] Filed: June 27, 1973

[21] Appl. No.: 373,911

[30] Foreign Application Priority Data
June 27, 1972 Germany............................ 2231348

[52] U.S. Cl. ............................. 136/6 GC; 136/154
[51] Int. Cl.² ........................................ H01M 10/00
[58] Field of Search...... 136/154, 120 FC, 20, 6 GC

[56] References Cited
UNITED STATES PATENTS
1,955,115   4/1934   Drumm........................... 136/154 X
2,994,625   8/1961   Mendelsohn..................... 136/154
3,457,111   7/1969   Witte et al. .................... 136/154 X
3,669,745   6/1972   Beccu .............................. 136/86 D
3,674,710   7/1972   Richter ......................... 136/120 FC Primary Examiner—Patrick P. Garvin
Assistant Examiner—John F. Niebling
Attorney, Agent, or Firm—Craig & Antonelli

[57] ABSTRACT

An electrolyte for use in galvanic cells having a hydrogen storage electrode and another electrode such as a metal electrode. The electrolyte is alkaline and contains alkali metal ions. In addition, ions of at least one oxy salt of metal not belonging to the Periodic Group of the alkali metals is contained therein. The deposition potential of these additional ions is at least 50 millivolts more negative than the reversible hydrogen potential in the electrolyte.

6 Claims, No Drawings

ELECTROLYTE FOR GALVANIC CELLS WITH HYDROGEN STORAGE ELECTRODES

This invention relates to an electrolyte for galvanic cells wherein the negative electrode is a hydrogen storage electrode.

In the conventional accumulator electrodes, a loss of capacity occurs which increases more or less rapidly with a growing number of charge-discharge cycles; this is due to irreversible side reactions. In order to diminish this disadvantage, it is known in several of the conventional electrodes to employ electrolyte additives, such as, for example, lithium hydroxide for nickel oxide cathodes, which reduce and/or slow down the above-mentioned loss of capacity and thus increase the useful lifetime of the battery.

In hydrogen storage electrodes, wherein, as the active mass accumulating hydrogen, at least one hydride of a transition metal of Groups III, IV, or V of the Periodic Table is utilized, there occurs a drop in capacity which becomes particularly great with a growing number of cycles. This is especially troublesome, because these galvanic elements with hydrogen storage electrodes are of special interest in battery technology, since they can be employed with high load capability and high mass-related capacity in secondary batteries, i.e., they operate in a reversible manner. On account of the characteristic of the hydrogen storage electrode which completely deviates from the conventional accumulator electrodes as described in German Published application No. 1,118,843, and wherein the active mass is not formed in a porous boundary layer, but by the incorporation of hydrogen in the entire expanse of the electrode, a capacity-stabilizing effect of conventional electrolyte additives cannot be expected and cannot be obtained.

It is an object of this invention to obtain, in a simple and economical manner, a stabilization of the capacity of hydrogen storage electrodes in galvanic cells.

This object is attained, according to the invention, by providing that the electrolyte is alkaline and contains, in addition to the alkali metal ions, ions of at least one oxy salt of a metal not belonging to the group of the alkali metals, and the deposition potential of the metal added is at least 50 millivolts more negative than the reversible hydrogen potential in the same electrolyte.

Preferably, the alkaline electrolyte contains aluminum (i.e. aluminate ions) as the additional ions.

Furthermore, a particularly good stabilization of the capacity results if the electrolyte contains, as the additional ions, ions of the oxy salts of zinc, tin, vanadium, molybdenum, tungsten, beryllium, or gallium.

In this connection, the electrolyte contains, for example, aluminum as the aluminate ions, zinc as the zincate ions, or beryllium as the beryllate ions.

The invention will be explained in greater detail below with reference to examples:

EXAMPLE 1

A hydrogen storage electrode having a weight of 35 g. was periodically charged in half-cell measuring arrangement with a current of 5 amperes and was discharged with the same amperage. The hydrogen storage electrode was a sintered plate made by sintering together a mixture of 50 percent by weight of 300 mesh nickel powder and titanium hydride (German patent application P 21 60 202. 8). The electrolyte employed was 6 M KOH with an addition of 0.3 percent by weight of aluminum hydroxide, dissolved to form aluminate ions in the electrolyte. Only minimal capacity fluctuations occurred during 250 charge-discharge cycles. In contrast thereto, for a hydrogen storage electrode of equal weight, operated with 6 M KOH as the electrolyte free of metal additive, the loss of capacity was 30 percent of the initial capacity under the same experimental conditions and after the same number of cycles.

EXAMPLE 2

A hydrogen storage electrode of a weight of 35 g. was periodically charged and discharged in a half-cell measuring arrangement under the conditions of the experiment set forth in Example 1. The electrolyte employed was 6 M KOH with an additive of 1.2 percent by weight ZnO, dissolved in the form of zincate ions. During 200 charge-discharge cycles, only minimal fluctuations in capacity occurred. In contradistinction thereto, for a hydrogen storage electrode of equal weight, operated with 6 M KOH free of additive, the loss of capacity was 28 percent of the initial capacity, under the same experimental conditions and after the same number of cycles.

EXAMPLE 3–8

Additional experiments were conducted in the same manner as Example 1. In these experiments, a compound of tin, vanadium, molybdenum, tungsten, beryllium and gallium, respectively was added to the 6 M KOH electrolyte. As shown in the following tabulation, in each case the additive metal of the invention served to stabilize the capacity of the hydrogen storage electrode.

| Example No. | Metal Compound Added | Amount Added % | Cycles Tested Without Substantial Fluctuation | Loss of Capacity Without Additional Ions |
|---|---|---|---|---|
| 3 | Sodium Stannate | 2.0 | 110 | 22% |
| 4 | Vanadium Pentoxide | 0.7 | 160 | 25% |
| 5 | Molybdenum trioxide | 2.0 | 160 | 25% |
| 6 | Sodium Tungstate | 3.4 | 160 | 25% |
| 7 | Beryllium hydroxide | 0.2 | 258 | 30% |
| 8 | Gallium hydroxide | 0.6 | 210 | 28% |

From the above examples, it will be understood that the addition of very small amounts of ionizable metal compounds other than those of the alkali metal to the alkaline electrolyte containing conventional levels of alkali metal ions promotes good stabilization of the capacity of the hydrogen storage electrodes. Furthermore, the amount of metal compounds may be varied but the concentration of the additional metal ions preferably is low, e.g. less than about 5 percent to enhance the capacity.

Also, it will be recognized that the additional metal ions added to the electrolyte form stable oxo-or hydroxo-complexes with the OH ions of the electrolyte, i.e., the metal added is contained in an anionic complex. In a highly alkaline electrolyte such as is conventionally used in batteries of this invention, hydroxides and oxides as well as all other electrolyte-soluble and dissociating compounds of these metals are converted into complex anionic species. So, in principle, it is immaterial if the metal added is in the form of an oxy salt or not, but oxy salts or hydroxides of these metals are preferred because no foreign ions which may be harmful to cell performance are introduced in this way. Due to the high alkalinity of the electrolyte and the low concentration of the additions, meta-oxy-salts are converted into the ortho-form, thus no distinction between meta and ortho salts need be made.

While the novel principles of the invention have been described, it will be understood that various omissions, modifications and changes in these principals may be made by one skilled in the art without departing from the spirit and scope of the invention.

What is claimed is:

1. An electrolytic in combination with a galvanic cell employing a hydrogen storage electrode, said electrolyte being alkaline and containing, besides alkali metal ions, additional ions of at least one oxy salt of a metal selected from the group consisting of aluminum, zinc, tin, vanadium, molybdenum, tungsten, beryllium, and gallium, the deposition potential of the metal contained in the electrolyte as an oxy salt being at least 50 millivolts more negative than the reversible hydrogen potential in the same electrolyte.

2. The combination according to claim 1, in which the additional ions are aluminate.

3. The combination according to claim 1, in which the hydrogen storage electrode is an electrode wherein as the active mass accumulating hydrogen is a titanium-nickel alloy.

4. The combination according to claim 1, in which the amount of metal contained in the electrolyte as an oxy salt is less than 5%.

5. In a galvanic cell employing a hydrogen storage electrode and containing an alkaline electrolyte, the improvement wherein said electrolyte contains alkali metal ions and additional ions of at least one oxy salt of a metal selected from the group consisting of aluminum, zinc, tin, vanadium, molybdenum, tungsten, beryllium, and gallium, the deposition potential of the metal contained in the electrolyte as an oxy salt being at least 50 millivolts more negative than the reversible hydrogen potential in the same electrolyte.

6. The galvanic cell according to claim 5, in which the additional ions are aluminate.

* * * * *